United States Patent
Greer, Jr. et al.

(10) Patent No.: US 10,932,554 B2
(45) Date of Patent: Mar. 2, 2021

(54) FEEDBACK DEVICE AND METHOD OF PROVIDING SAME FOR USERS OF ORAL CARE DEVICES APPLYING PRESSURE DURING USE

(71) Applicant: KONINKLIJKE PHILIPS N.V., Eindhoven (NL)

(72) Inventors: Lester Ronald Greer, Jr., Edmonds, WA (US); Scott Bellamy, Mill Creek, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 38 days.

(21) Appl. No.: 16/072,710

(22) PCT Filed: Jan. 23, 2017

(86) PCT No.: PCT/EP2017/051286
§ 371 (c)(1),
(2) Date: Jul. 25, 2018

(87) PCT Pub. No.: WO2017/129509
PCT Pub. Date: Aug. 3, 2017

(65) Prior Publication Data
US 2019/0038014 A1 Feb. 7, 2019

Related U.S. Application Data

(60) Provisional application No. 62/350,841, filed on Jun. 16, 2016, provisional application No. 62/287,138, filed on Jan. 26, 2016.

(51) Int. Cl.
A46B 15/00 (2006.01)
A61C 17/34 (2006.01)

(52) U.S. Cl.
CPC ...... *A46B 15/0012* (2013.01); *A46B 15/0044* (2013.01); *A46B 2200/1066* (2013.01); *A61C 17/34* (2013.01)

(58) Field of Classification Search
CPC ............ A46B 15/0012; A46B 15/0044; A46B 2200/1066; A46B 15/0004;
(Continued)

(56) References Cited

U.S. PATENT DOCUMENTS 6,536,068 B1 * 3/2003 Yang .................. A46B 15/0002
15/105
9,044,083 B2 * 6/2015 Nanda ....................... A46B 9/04
(Continued)

FOREIGN PATENT DOCUMENTS

JP 2002325634 A 11/2002

*Primary Examiner* — Dung Van Nguyen (57) ABSTRACT

An oral cleaning device (10) configured to provide real-time feedback to a user. The oral cleaning device comprises a pressure sensor (12) configured to obtain pressure sensor data during a cleaning session; a visual indicator (46) configured to provide feedback about pressure to the user during the brushing session; and a controller (30) in communication with the pressure sensor and the visual indicator, wherein the controller is configured to: receive, from the pressure sensor, the pressure sensor data; determine an amount of pressure being applied by the user of the oral cleaning device; and provide, using the visual indicator, a visual indication of the amount of pressure being applied by the user of the oral cleaning device.

15 Claims, 4 Drawing Sheets

(58) Field of Classification Search
CPC .............. A46B 15/0014; A61C 17/34; A61C 17/17221; A61C 17/22; A61C 17/15047; A41H 1/02
See application file for complete search history.

(56) References Cited

U.S. PATENT DOCUMENTS

| | | | |
|---|---|---|---|
| 10,349,733 B2* | 7/2019 | Serval | A46B 15/0012 |
| 2010/0325828 A1* | 12/2010 | Braun | A46B 15/0002 |
| | | | 15/167.1 |
| 2013/0000059 A1 | 1/2013 | Jungnickel et al. | |
| 2013/0247321 A1* | 9/2013 | Sichau | A46B 15/0046 |
| | | | 15/167.1 |
| 2015/0313353 A1 | 11/2015 | Schmalhurst et al. | |

* cited by examiner

FEEDBACK DEVICE AND METHOD OF PROVIDING SAME FOR USERS OF ORAL CARE DEVICES APPLYING PRESSURE DURING USE

CROSS-REFERENCE TO PRIOR APPLICATIONS

This application is the U.S. National Phase application under 35 U.S.C. § 371 of International Application No. PCT/EP2017/051286, filed on Jan. 23, 2017, which claims the benefit of U.S. Provisional Patent Application No. 62/350,841, filed on Jun. 16, 2016 and U.S. Provisional Patent Application No. 62/287,138, filed on Jan. 26, 2016. These applications are hereby incorporated by reference herein.

FIELD OF THE INVENTION

The present disclosure is directed generally to methods and systems for providing, to a user of an oral cleaning device, feedback about a cleaning session using light.

BACKGROUND

Proper tooth brushing, including length and coverage of brushing, helps ensure long-term dental health. Many dental problems are experienced by individuals who either do not regularly brush their teeth or who do so inadequately, especially in a particular area or region of the oral cavity. Among individuals who do brush regularly, improper brushing habits can result in poor coverage of brushing and thus surfaces that are not adequately cleaned during a cleaning session, even when a standard brushing regimen is followed.

To facilitate proper brushing, it is important to ensure that the user is applying the proper amount of pressure, as correct pressure enhances positive clinical results. In contrast, the user must avoid using excessive pressure during a cleaning session, as excessive pressure can result in tissue abrasion and damage. Further, when an individual uses excessive pressure in applying a toothbrush to teeth, the pressure can cause the oscillations of the brush to slow. In many cases, the decreased oscillations of the brush prevent the numerous advantages otherwise gained by an electric toothbrush. This is especially true in the case of sonic vibrating toothbrushes. When excessive pressure causes these brushes to slow and oscillate at smaller amplitudes, the bristles no longer can induce proper vibration of the adjacent oral fluids. Consequently, advantages normally gained by using this type of toothbrush are substantially lost.

Pressure sensors can be used to monitor the pressure applied to the oral tissues during a cleaning session, and can warn a user that they are using excessive brushing force. These pressure sensors typically include an electromechanical transducer which generates a signal that affects one or more other components of the toothbrush. For example, once the pressure sensor detects excessive pressure, it can actuate an alarm and/or deactivate the drive unit of the oral cleaning device. However, the alarms are often not provided in real-time, and are often not detected by the user. As a result, the excessive pressure condition will continue and the cleaning session will be less effective.

Accordingly, there is a continued need in the art for methods and devices that provide real-time feedback to a user about the amount of pressure being applied during an oral cleaning session.

SUMMARY OF THE INVENTION

The present disclosure is directed to inventive methods and systems for providing feedback about a cleaning session to a user of an oral cleaning device. Applied to an electric oral cleaning device with a pressure sensor configured to monitor the pressure being applied to the device and thus to the oral tissues, the inventive methods and systems enable real-time feedback to the user about that pressure. When the system identifies an excessive pressure condition and provides that information to the user, the user can take corrective measures to reduce the pressure. The electric oral cleaning device is also equipped with a notification component coupled to the pressure sensor which generates a notification when the pressure sensor detects excessive pressure. The signal results in illumination of a light ring at the end of the oral cleaning device which is visible to the user when the cleaning end of the oral cleaning device is located within the user's mouth. Accordingly, the system utilizes pressure sensor data to monitor the amount of pressure applied during a cleaning session, and communicates that information to the user via the light ring, therefore ensuring optimal cleaning performance.

Generally in one aspect, a method for providing feedback to a user of an oral cleaning device is provided. The method includes the steps of: receiving, from a pressure sensor of the oral cleaning device, pressure sensor data during a cleaning session; determining, by a controller of the oral cleaning device using the received pressure sensor data, an amount of pressure being applied by the user of the oral cleaning device; and providing, via a visual indicator of the oral cleaning device, a visual indication of the amount of pressure being applied by the user of the oral cleaning device.

According to an embodiment, the determining step of the method comprises the step of comparing the amount of pressure being applied by the user of the oral cleaning device to a predefined threshold.

According to an embodiment, the visual indication is provided only if the amount of pressure being applied by the user of the oral cleaning device exceeds the predefined threshold.

According to an embodiment, the visual indication is provided only if the amount of pressure being applied by the user of the oral cleaning device falls below the predefined threshold.

According to an embodiment, the visual indicator is a light ring located at a distal end of body portion of the oral cleaning device, and comprises one or more LEDs.

According to an embodiment, the visual indicator comprises a plurality of LEDs of two or more different colors.

According to an embodiment, the method further includes the step of adjusting, based on the amount of pressure being applied by the user of the oral cleaning device, a mode of the oral cleaning device.

According to an embodiment, the visual indicator is further configured to provide a visual indication of a charging state of a battery of the oral cleaning device.

According to an aspect is an oral cleaning device configured to provide real-time feedback to a user. The device comprises: a pressure sensor configured to obtain pressure sensor data during a cleaning session; a visual indicator configured to provide feedback about pressure to the user during the brushing session; and a controller in communication with the pressure sensor and the visual indicator, wherein the controller is configured to: receive, from the pressure sensor, the pressure sensor data; determine an amount of pressure being applied by the user of the oral cleaning device; and provide, using the visual indicator, a visual indication of the amount of pressure being applied by the user of the oral cleaning device.

According to an aspect is an oral cleaning device configured to provide real-time feedback to a user. The device comprises: a pressure sensor configured to obtain pressure sensor data during a cleaning session; a visual indicator configured to provide feedback about pressure to the user during the brushing session, the visual indicator comprising a light ring located at a distal end of body portion of the oral cleaning device, the light ring comprising a plurality of LEDs; and a controller in communication with the pressure sensor and the visual indicator, wherein the controller is configured to: receive, from the pressure sensor, the pressure sensor data; determine an amount of pressure being applied by the user of the oral cleaning device; and provide, using the visual indicator, a visual indication of the amount of pressure being applied by the user of the oral cleaning device, wherein the visual indication is provided only if the amount of pressure being applied by the user of the oral cleaning device exceeds a predefined threshold.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure describes various embodiments of a method and device for providing feedback about a cleaning session to a user of an oral cleaning device. More generally, Applicant has recognized and appreciated that it would be beneficial to provide a system to monitor the pressure applied by the user of an oral cleaning device in order to evaluate a user's cleaning session and provide feedback. Accordingly, the methods described or otherwise envisioned herein provide an oral cleaning device configured to provide information about the amount of pressure being applied to oral tissues using a light indicator. According to an embodiment, the oral cleaning device comprises a pressure sensor to obtain sensor data utilized to evaluate the amount of pressure exerted by the user on oral tissues, and comprises a light indicator configured to communicate that evaluation to the user.

A particular goal of utilization of the embodiments and implementations herein is to provide brushing information and feedback using an oral cleaning device such as, e.g., a Philips Sonicare™ toothbrush (manufactured by Koninklijke Philips Electronics, N.V.).

Figure 1:
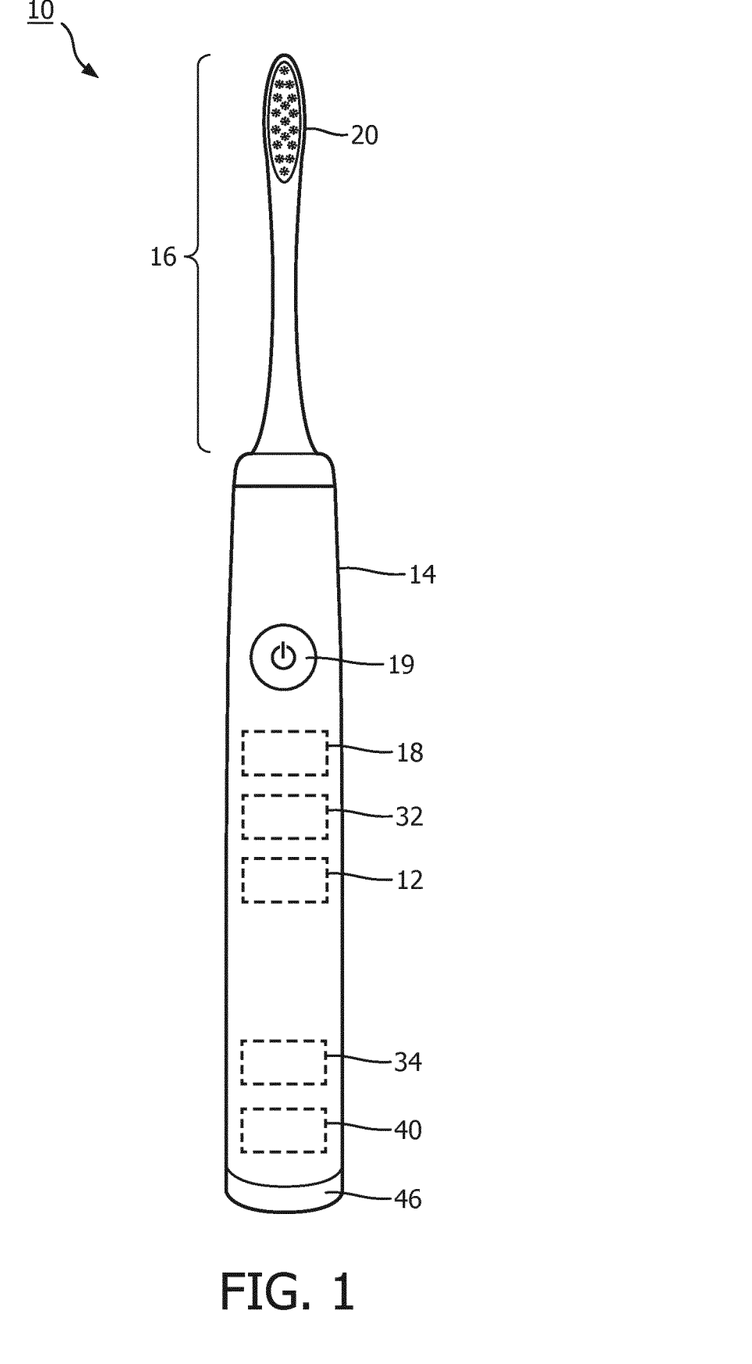
FIG. 1 is a schematic representation of an oral cleaning device, in accordance with an embodiment.

Referring to FIG. 1, in one embodiment, an oral cleaning device 10 is provided that includes a body portion 14 and a brush head member 16 mounted on the body portion. Brush head member 16 includes at its end remote from the body portion a set of bristles 20. According to an embodiment, the bristles extend along an axis substantially perpendicular to the head's axis of elongation, although many other embodiments of the brush head and bristles are possible.

According to an embodiment, bristles 20 and/or a portion or the entirety of brush head member 16 are mounted so as to be able to move relative to the body portion 14. The movement can be any of a variety of different movements, including vibrations or rotation, among others. According to one embodiment, head member 16 is mounted to the body so as to be able to vibrate relative to body portion 14, or, as another example, the brush head is mounted to head member 16 so as to be able to vibrate relative to body portion 14. The head member 16 can be fixedly mounted onto body portion 14, or it may alternatively be detachably mounted so that head member 16 can be replaced with a new one when the bristles or another component of the device are worn out and require replacement.

According to an embodiment, body portion 14 includes an electrically powered drive assembly 18 for generating movement and a transmission component for transmitting the generated movements to brush head member 16, causing the brush head member 16 and/or bristles 20 to vibrate in an oscillatory pattern. The drive assembly can comprise a motor or electromagnet(s) that generates movement of the transmission component, which is subsequently transmitted to the brush head member 16. The drive assembly can include components such as a power supply 34, an oscillator, and one or more electromagnets, among other components. In one embodiment the power supply 34 comprises one or more rechargeable batteries which can, for example, be electrically charged in a charging holder in which oral cleaning device 10 is placed when not in use.

Body portion 14 is further provided with a user input 19 to activate and de-activate drive assembly 18. The user input 19 allows a user to operate the oral cleaning device, for example to turn the device on and off. The user input 19 may, for example, be a button, touch screen, or switch.

Although in the present embodiment the oral cleaning device 10 is an electric toothbrush, it will be understood that in an alternative embodiment the oral cleaning device is a manual toothbrush (not shown). In such an arrangement, the manual toothbrush has electrical components, but the brush head is not mechanically actuated by an electrical component.

The oral cleaning device 10 includes one or more pressure sensors 12. Pressure sensor 12 is shown in FIG. 1 within body portion 14, but may be located anywhere within the device, including for example within brush head member 16. The pressure sensor 12 can comprise, for example, any pressure sensor sufficient to detect the amount of pressure applied by the user, including but not limited to a Hall effect sensor. According to an embodiment, pressure sensor 12 detects the amount of pressure exerted on the oral tissues by the brush head 16 by measuring displacement of the brush head relative to the body portion 14. Many other methods of determining pressure are possible. Other sensors may be utilized either alone or in conjunction with the pressure sensor 12, including but not limited to a 6-axis or a 9-axis spatial sensor system, and can include one or more of an accelerometer, a gyroscope, and/or a magnetometer to provide readings relative to axes of motion of the oral cleaning device, and to characterize the orientation and displacement of the device. Still other types of possible sensors include a sensor measuring electromagnetic waveforms on a predefined range of wavelengths, a capacitive sensor, a camera, a photocell, a visible light sensor, a near-infrared sensor, a radio wave sensor, and/or one or more other types of sensors. Many different types of sensors could be utilized, as described or otherwise envisioned herein.

According to an embodiment, pressure sensor 12 generates pressure sensor data indicative of the amount of pressure being applied to the oral tissues by the user, and transmits that generated pressure sensor data to a controller 32. Controller 32 may be formed of one or multiple modules, and is configured to operate the oral cleaning device 10 in response to an input, such as input obtained via user input 19. For example, controller 32 selectively controls the application of voltage to the power drive assembly from the battery 34, which causes brush head 16 and/or bristles 20 to oscillate. Pressure sensor 12 can be separate from or integral to the controller 32. Controller 32 can comprise, for example, at least a processor and a memory. The processor may take any suitable form, including but not limited to a microcontroller, multiple microcontrollers, circuitry, a single processor, or plural processors. The memory can take any suitable form, including a non-volatile memory and/or RAM. The non-volatile memory may include read only memory (ROM), a hard disk drive (HDD), or a solid state drive (SSD). The memory can store, among other things, an operating system. The RAM is used by the processor for the temporary storage of data. According to an embodiment, an operating system may contain code which, when executed by controller 32, controls operation of the hardware components of oral cleaning device 10.

The oral cleaning device 10 includes one or more visual indicators 46 located in or on the body portion 14 and configured to provide visual feedback about pressure to the user. According to an embodiment, controller 32 sends a signal to a light circuit 40 when excessive pressure is detected. Light circuit 40 includes electronics and one or more visual indicators 46 which are illuminated when excessive pressure is detected and the signal is received from the controller 32. According to an embodiment, the visual indicator 46 comprises a light ring made of translucent material at the distal end of the brush handle, providing a visual indicator to the user. Because of the location of this light ring 46, at the distal end of the brush handle 14, it is visible to the user when the brush head member 16 is located within the user's mouth.

Figure 2:
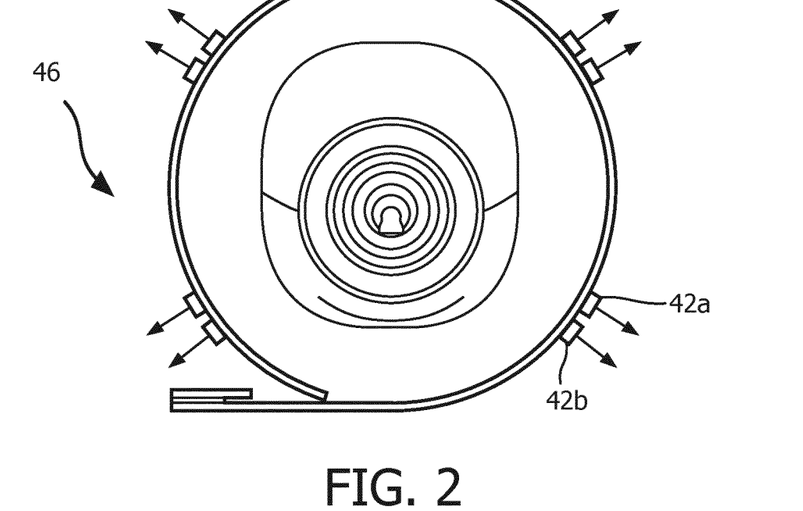
FIG. 2 is a schematic representation of a visual indicator of an oral cleaning device, in accordance with an embodiment.
Figure 3:
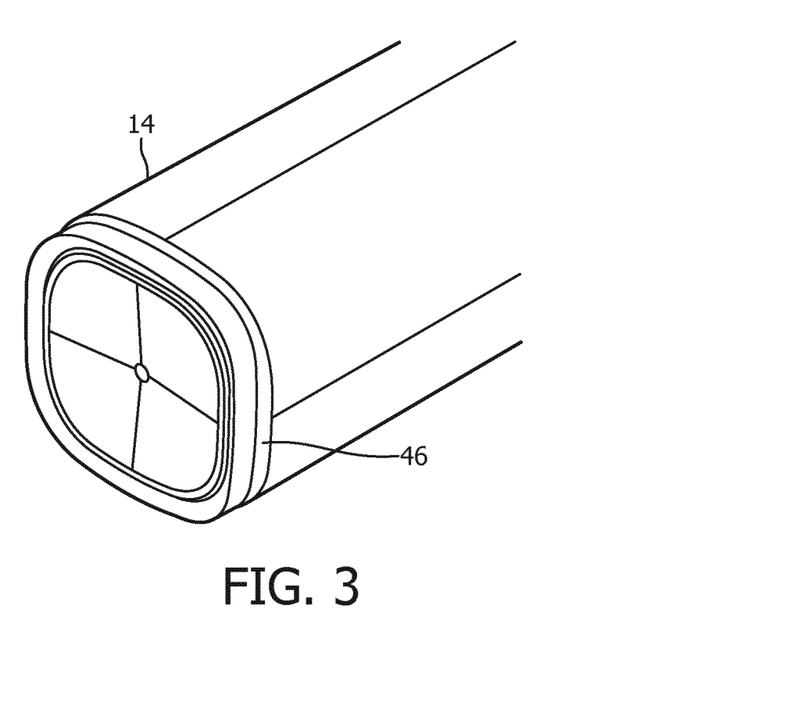
FIG. 3 is a schematic representation of a visual indicator of an oral cleaning device, in accordance with an embodiment.
Figure 4:
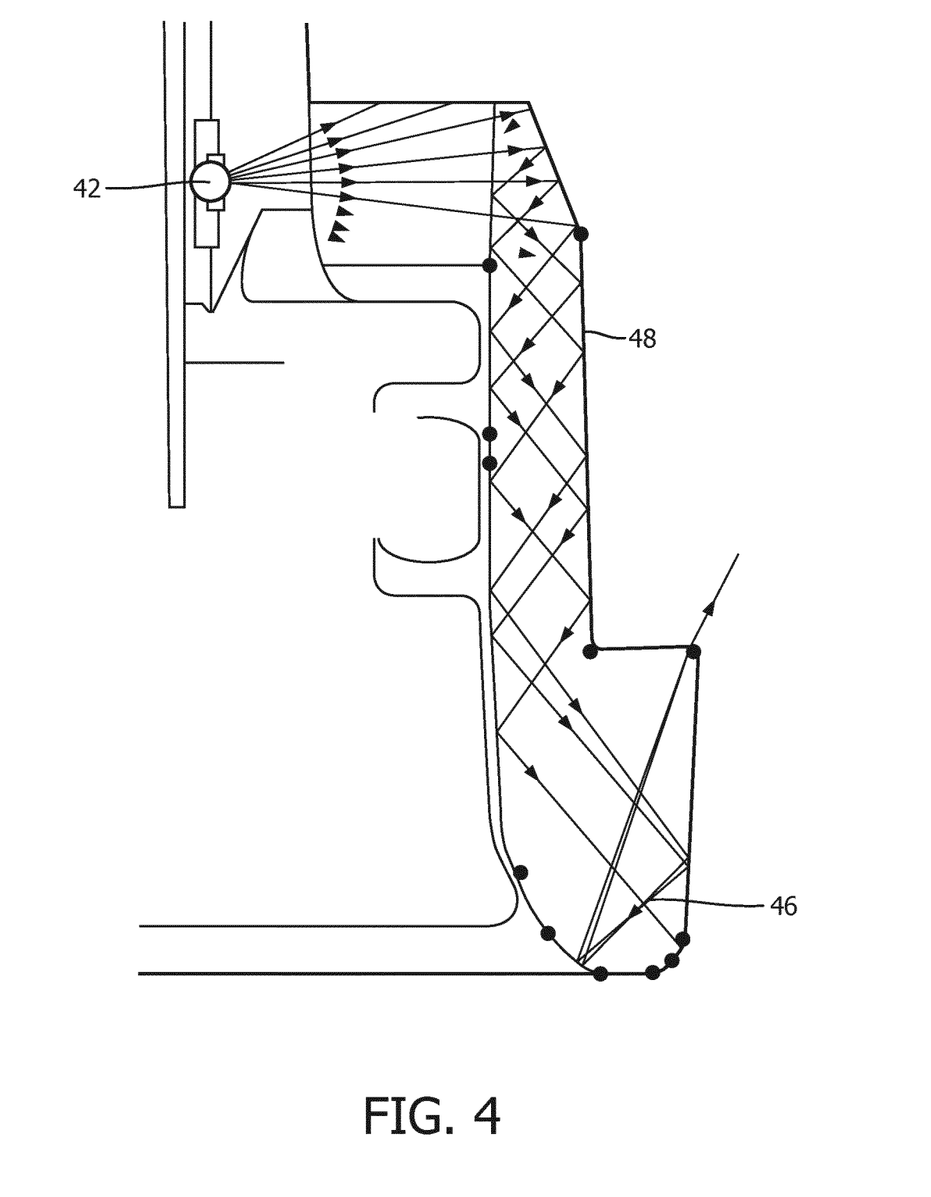
FIG. 4 is a schematic representation of a cutaway view of the bottom interior portion of an oral cleaning device, in accordance with an embodiment.

Referring to FIG. 2, in one embodiment, is a configuration of visual indicator 46. The visual indicator can be, for example, a multi-color LED, such as a red, green, blue (RGB) LED, which has one or more red LEDs 42a and one or more green LEDs 42b. When the red LEDs 42a are illuminated the light ring 46 will show red, when the green LEDs 42b are illuminated the light ring 46 will show green, and when both the red LEDs 42a and green LEDs 42b are illuminated, the light ring 46 will show blue. According to one embodiment, the light circuit is made of a flexible material comprising four sets of RGB LEDs and made in a curved shape that can be inserted in the handle portion 14 of oral cleaning device 10. With four sets of LEDs equally spaced around the circumference of the inside of the handle 14, the illumination is dispersed consistently out of the visual indicator 46, which can be a light ring, as shown in FIG. 3. For example, as shown in FIG. 4, the visual indicator 46 can include one or more reflectors 48 to direct, focus, or disperse the light from the LEDs 42 to a light ring, thereby providing the proper visual indicator to the user.

According to an embodiment, visual indicator 46 can also be used not only to indicate excessive pressure but also insufficient pressure. For example, multiple colors can be displayed via visual indicator 46, with different colors indicating either excessive or insufficient pressure. According to one embodiment, an LED illumination pattern is as follows: (1) if the pressure is above a minimum threshold and below a maximum threshold, only green LEDs are illuminated; (2) if the pressure is above the maximum threshold only the red LEDs are illuminated; (3) if the pressure is less than the minimum threshold, both the red and green LEDs are illuminated, resulting in blue light. According to another embodiment if the pressure is less than the minimum threshold, no LED will be illuminated, and both red and green LEDs being illuminated can be used for another purpose, such as signaling charge state of the oral cleaning device 10, or for some other purpose. An advantage of the visual feedback arrangement is that it supplies positive reinforcement to the user, including providing feedback if too little or too much pressure is being applied.

According to another embodiment, the controller may be configured to activate the light circuit 40 and visual indicator 46 only when a true excessive pressure situation is detected. For example, the system can monitor and evaluate the pressure data from pressure sensor 12 to determine whether an excessive pressure detection is a momentary occurrence or whether the excessive pressure is maintained over a sustained period of time. When there is continued excessive pressure, either meeting a predetermined or predefined pressure value or for a predetermined or predefined amount of time, then the controller can send a signal to the light circuit 40 to activate the visual indicator 46. If the excessive pressure was just a momentary occurrence, for example when the user bears down too hard against the toothbrush for just a moment, the system can treat the pressure as merely a spike event and will not provide visual feedback to the user.

According to another embodiment, the controller may be configured to deactivate and/or change a mode of the oral cleaning device drive assembly 18 when the pressure reaches a predetermined or predefined level, such as a level which may be damaging to tissue. For example, the controller may slow the oral cleaning device drive assembly 18, or speed up the oral cleaning device drive assembly 18, depending on the programming of the device. The oral cleaning device can also provide a visual indication to the user of the deactivation or mode change using visual indicator 46.

Figure 5:
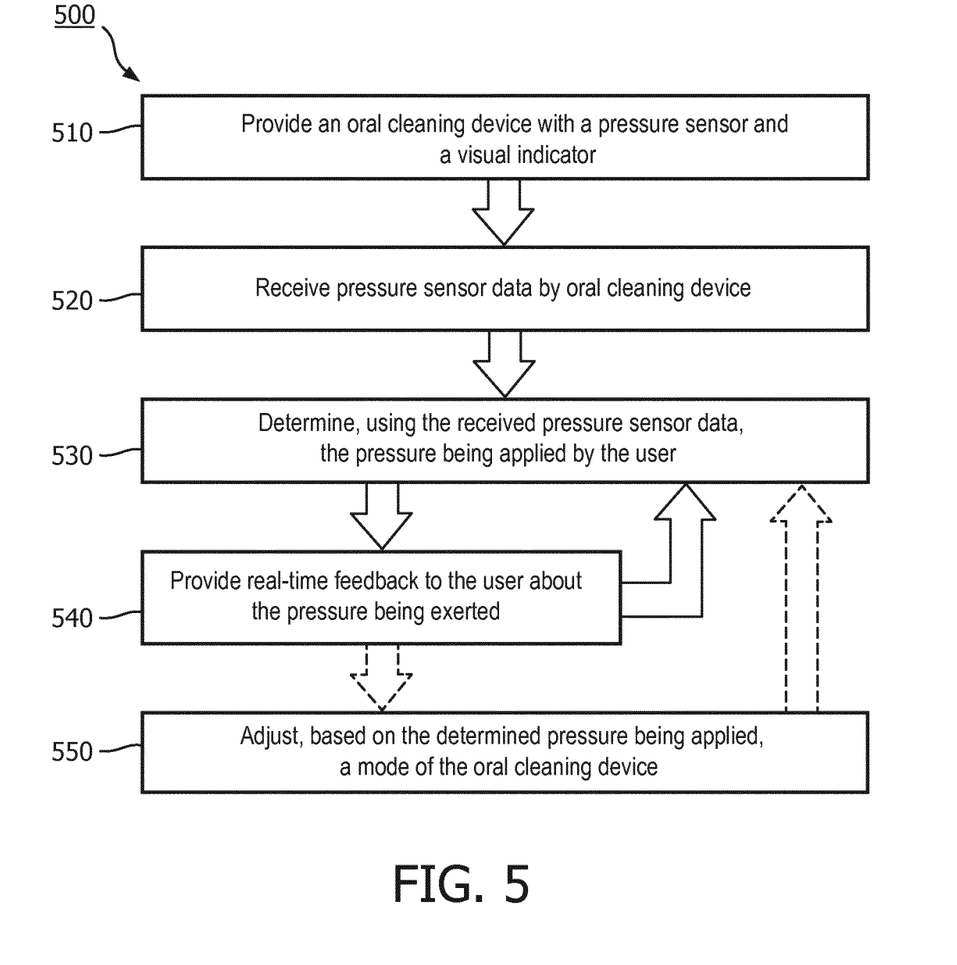
FIG. 5 is a flowchart of a method for providing pressure feedback to a user of an oral cleaning device, in accordance with an embodiment.

Referring to FIG. 5, in one embodiment, is a flowchart of a method 500 for providing pressure feedback to a user of an oral cleaning device 10. In step 510, an oral cleaning device 10 is provided. The oral cleaning device can be any of the devices described or otherwise envisioned herein. For example, the oral cleaning device includes a pressure sensor 12, controller 32, light circuit 40, and visual indicator 46.

At step 520 of the method, the controller 32 of the oral cleaning device receives pressure sensor data from the pressure sensor. The pressure sensor and/or controller can be configured to receive pressure sensor data continuously or periodically.

At step 530 of the method, the controller 32 evaluates the received pressure sensor data to determine, quantify, or otherwise analyze the amount of pressure being applied by the user. The controller may also make this determination continuously, or may average or otherwise determine the pressure applied over one or more time points. For example, the controller can compare the detected pressure to a predefined minimum and/or maximum threshold. According to an embodiment, controller 32 can send signals to the light circuit 40 based on the comparison of the detected pressure to the predefined minimum and/or maximum threshold. For example, the controller may send different signals to the light circuit 40 when the detected pressure is above a minimum threshold and below a maximum threshold, when the detected pressure is less than the minimum threshold, or when the detected pressure is greater than the maximum threshold. Alternatively, the controller 32 can be configured to only send a signal to the light circuit 40 when excessive pressure is detected.

At step 540 of the method, the light circuit 40 produces feedback to the user via light from visual indicator 46 to communicate information about the detected pressure. According to an embodiment, the visual indicator 46 comprises a light ring made of translucent material at the distal end of the brush handle, providing a visual indicator to the user. For example, the visual indicator can comprise a multi-color LED, such as a red, green, blue (RGB) LED, which has one or more red LEDs and one or more green LEDs, although many other combinations and colors are possible. The visual indicator may illuminate white or any other color when an excessive pressure condition is detected. The visual indicator may also illuminate a range of colors to indicate the amount of pressure being applied by the user.

As another example, the visual indicator can be configured to communicate pressure information at all times without regard to an excessive or under-pressure condition. For example, the visual indicator may range along a continuous spectrum to indicate pressure in real-time. As the user applies pressure, the visual indicator either changes color or increases intensity steadily to indicate the increase in pressure. As the user lessens the pressure, the visual indicator either changes color or decreases intensity steadily to indicate the decrease in pressure.

At optional step 550 of the method, the controller may change a mode of the oral cleaning device to adapt to a pressure condition. For example, the controller may be configured to deactivate the oral cleaning device drive assembly 18 when the pressure reaches a predetermined or predefined level, such as a level which may be damaging to tissue. The controller may be configured to slow or speed up the oral cleaning device drive assembly 18 when the pressure reaches a predetermined or predefined level. For example, excessive pressure may cause the oscillations of an oral cleaning device to slow, and the controller can increase the oscillation frequency of the oral cleaning device in order to adapt. The controller may also be configured to lower the oscillation frequency of the oral cleaning device when little or no pressure is being applied, thereby conserving battery. At the same time, visual information is being conveyed to the user to indicate the pressure condition of the oral cleaning device.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of" will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A method for providing real-time feedback to a user of an oral cleaning device, the method comprising the steps of:
receiving, from a pressure sensor of the oral cleaning device, pressure sensor data over a period of time during a cleaning session;
determining, by a controller of the oral cleaning device using the received pressure sensor data, whether there is a continued excessive pressure being applied by the user of the oral cleaning device during the period of time by comparing an amount of pressure being applied by the user of the oral cleaning device to a predefined pressure threshold and determining whether the amount of pressure being applied that meets or exceeds the predefined pressure threshold is maintained for a predefined amount of time during the period of time;
providing a visual indication in real-time during the period of time, via a visual indicator of the oral cleaning device, when it is determined that the continued excessive pressure is being applied; and
providing another visual indication, via the visual indicator of the oral cleaning device, when a speed of the oral cleaning device has changed.

2. The method of claim 1, wherein said visual indication is provided only if the amount of pressure being applied by the user of the oral cleaning device exceeds the predefined pressure threshold and the amount of pressure is maintained for an amount of time that exceeds the predefined amount of time.

3. The method of claim 1, further comprising the step of providing another visual indication, via the visual indicator, if the amount of pressure being applied by the user of the oral cleaning device falls below the predefined pressure threshold.

4. The method of claim 1, wherein the visual indicator is a light ring located at a distal end of a body portion of the oral cleaning device, the light ring comprising one or more LEDs.

5. The method of claim 1, wherein the visual indicator comprises a plurality of LEDs of two or more different colors.

6. The method of claim 1, further comprising the step of adjusting, based on the amount of pressure being applied by the user of the oral cleaning device, a mode of the oral cleaning device.

7. The method of claim 1, further comprising the step of changing an intensity of the visual indication to indicate a change in the continued excessive pressure being applied.

8. A method for providing real-time feedback to a user of an oral cleaning device, the method comprising the steps of:
receiving, from a pressure sensor of the oral cleaning device, pressure sensor data during a cleaning session;
determining, by a controller of the oral cleaning device using the received pressure sensor data, whether there is a continued excessive pressure being applied by the user of the oral cleaning device by comparing an amount of pressure being applied by the user of the oral cleaning device to at least one of a predefined pressure threshold and a predefined time threshold; and
providing a visual indication in real-time, via a visual indicator of the oral cleaning device, when it is determined that the continued excessive pressure is being applied wherein the visual indicator is further configured to provide another visual indication of a charging state of a battery of the oral cleaning device.

9. An oral cleaning device configured to provide real-time feedback to a user, the device comprising:
a pressure sensor configured to obtain pressure sensor data over a period of time during a cleaning session;
a visual indicator configured to provide feedback about pressure to the user during the brushing session and a change in a speed of the oral cleaning device; and
a controller in communication with the pressure sensor and the visual indicator, wherein the controller is configured to: receive, from the pressure sensor, the pressure sensor data over the period of time; determine whether there is a continued excessive pressure being applied by the user of the oral cleaning device during the period of time by comparing an amount of pressure being applied by the user of the oral cleaning device to a predefined pressure threshold and determining whether the amount of pressure being applied that meets or exceeds the predefined pressure threshold is maintained for a predefined amount of time during the period of time; and provide, using the visual indicator, a visual indication in real-time during the period of time when it is determined that the continued excessive pressure is being applied wherein the controller is further configured to provide, using the visual indicator, another visual indication of the change in the speed of the oral cleaning device.

10. The oral cleaning device of claim 9, wherein the visual indicator is located in a handle of the oral cleaning device distal from a brush head of the oral cleaning device.

11. The oral cleaning device of claim 9, wherein the visual indicator comprises a plurality of LEDs of two or more different colors.

12. The oral cleaning device of claim 9, wherein the visual indicator comprises a light ring located at a distal end of a body portion of the oral cleaning device, the light ring comprising one or more LEDs.

13. The oral cleaning device of claim 9, wherein said visual indication is provided only if the amount of pressure being applied by the user of the oral cleaning device exceeds the predefined pressure threshold and the amount of pressure is maintained for an amount of time that exceeds the predefined amount of time.

14. The oral cleaning device of claim 9, wherein the controller is further configured to provide another visual indication if the amount of pressure being applied by the user of the oral cleaning device falls below the predefined pressure threshold.

15. The oral cleaning device of claim 9, wherein the controller is further configured to change an intensity of the visual indication to indicate a change in the continued excessive pressure being applied.

* * * * *